United States Patent [19]

Ohga et al.

[11] Patent Number: 5,474,589
[45] Date of Patent: Dec. 12, 1995

[54] UV LIGHT-PERMEABLE GLASS AND ARTICLE COMPRISING THE SAME

[75] Inventors: Yuichi Ohga; Shinji Ishikawa; Tatsuhiko Saito; Hiroshi Yokota; Michihisa Kyoto, all of Yokohama, Japan

[73] Assignee: Sumitomo Electric Industries, Ltd., Osaka, Japan

[21] Appl. No.: 226,413

[22] Filed: Apr. 12, 1994

Related U.S. Application Data

[63] Continuation of Ser. No. 798,806, Nov. 27, 1991, abandoned.

[30] Foreign Application Priority Data

Nov. 28, 1990 [JP] Japan ................................. 2-328327

[51] Int. Cl.$^6$ ............................................ C03B 37/018
[52] U.S. Cl. .............................................. 65/397; 65/399
[58] Field of Search ........................ 430/65, 67; 428/426, 428/701, 702, 913, 704; 65/3.11, 3.12, 397, 399; 385/123

[56] References Cited

U.S. PATENT DOCUMENTS

| | | | |
|---|---|---|---|
| Re. 30,883 | 3/1982 | Rau et al. | 385/123 |
| 4,443,529 | 4/1984 | Kanabe et al. | 430/65 |
| 4,765,815 | 8/1988 | Danzuka et al. | 65/3.12 |
| 4,797,143 | 1/1989 | Chida et al. | 65/3.12 |
| 4,812,155 | 3/1989 | Kyoto et al. | 65/3.11 |
| 4,822,349 | 4/1989 | Kanamori et al. | 65/3.12 |
| 4,846,867 | 7/1989 | Yokota et al. | 65/3.12 |
| 4,859,222 | 8/1989 | Bauch et al. | 65/3.11 |
| 5,028,967 | 7/1991 | Yamada et al. | 372/101 |

FOREIGN PATENT DOCUMENTS

| | | |
|---|---|---|
| 3835208 | 5/1990 | Germany. |
| 4008383 | 9/1990 | Germany. |

OTHER PUBLICATIONS

Mulder "Defect Structure in Silica Glass" J. Non–Crys. Solids, 95 & 96 (1987) pp. 303–310.

Kyoto et al. "Characterisation of fluorine–doped silica glasses" J. Materials Sci. 28 (1993) pp. 2728–2744.

Tsukuma, et al., "Refractive Index, Dispersion and Absorption of Fluorine–doped Silica Glass in the Deep UV Region", Journal of Non–Crystalline Solids, vol. 127, No. 2 Feb. 1, 1991.

ECOC '84 (Tenth European Conference on Optical Communication), "The Characteristics of Fluorine Added VAD Single–Mode Fiber", Sep. 3–6, 1984.

Primary Examiner—Archene Turner
Attorney, Agent, or Firm—Cushman Darby & Cushman

[57] ABSTRACT

A UV light-permeable optical glass consisting of a fluorine-doped synthetic quartz glass, which has a long term reliability.

4 Claims, 2 Drawing Sheets

UV LIGHT-PERMEABLE GLASS AND ARTICLE COMPRISING THE SAME

This is a continuation of application Ser. No. 07/798,806, filed on Nov. 27, 1991, which was abandoned upon the filing hereof.

BACKGROUND OF THE INVENTION

1. Field of the Invention

The present invention relates to a UV light-permeable glass and an article comprising the same. More particularly, the present invention relates to a glass which is permeable to UV light and comprises a fluorine-doped synthetic quartz glass and an article made of such glass.

2. Description of the Related Art

Hitherto, as a UV light-permeable glass, only synthetic quartz glass is known. However, the synthetic quartz glass has various defect absorption depending on methods for producing the same. Main defect absorptions are specific defect absorptions due to atomic groups having free radicals such as Si—Si, Si., Si—O—O—Si and Si—O—O. (see J. Appl. Phys. 65(12), 15, June 1989, and Physical Review B, 38, 17 (1988)).

As a glass material which reduces such defects and is excellent in permeability in UV range, a synthetic quartz glass containing OH groups in a high concentration such as 100 to 1000 ppm is commercially available.

However, when the synthetic quartz glass having the high OH concentration is irradiated with a high energy UV light such as an excimer laser for a long time, other problems such as generation of fluorescence and formation of new absorption bands arise, so that such quartz glass does not have a long term reliability.

SUMMARY OF THE INVENTION

An object of the present invention is to provide a UV light-permeable synthetic quartz glass which can decrease or remove the defects and has a long term reliability.

Another object of the present invention is to provide an article made of a UV light-permeable synthetic quartz glass which can decrease or remove the defects and has a long term reliability.

According to the present invention, there is provided a UV light-permeable optical glass consisting of a fluorine-doped synthetic quartz glass.

DETAILED DESCRIPTION OF THE DRAWINGS

The fluorine-doped synthetic quartz glass is known a synthetic quartz glass preform for the fabrication of an optical fiber, which preform has a decreased refractive index. The fluorine-doped synthetic quartz glass of the present invention has a few or no defect absorption in the UV range, in particular, in the commercially important wavelength range between 155 nm and 400 nm, and does not have new defects even after irradiation of the high energy UV light for a long time.

The defect absorptions of the synthetic quartz glass are roughly classified in an oxygen-shortage type defect and an oxygen-surplus type defect. The former defect has an absorption band at 165 nm and 250 nm due to the Si—Si group and is most serious when the glass is used as a UV light-permeable material. When the glass having the oxygen-shortage type defects is irradiated with the high energy UV light such as the excimer laser, the Si—Si linkage is cleaved to form Si. (E' center) which absorbs a light having a wavelength of 215 nm and creates a new defect. The latter defect has an absorption band at 325 nm due to the Si—O—O—Si group. By the irradiation with the high energy UV light, this group will generate the free radicals such as Si—O—O. and Si—O. and ultimately Si., which are causes a new problem.

The above problems can be overcome by the UV light-permeable glass of the present invention.

Figure 1:
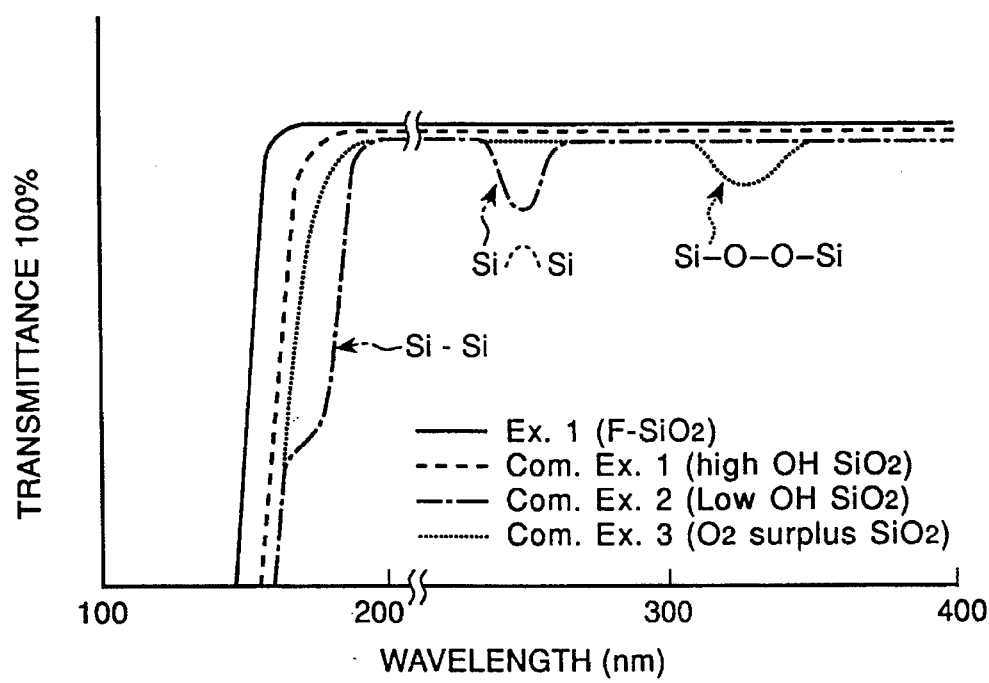
FIGS. 1 and 2 are graphs showing transmissions of various synthetic quartz glasses and the fluorine-doped synthetic quartz glass of the present invention before and after irradiation with an excimer layer, respectively.
Figure 2:
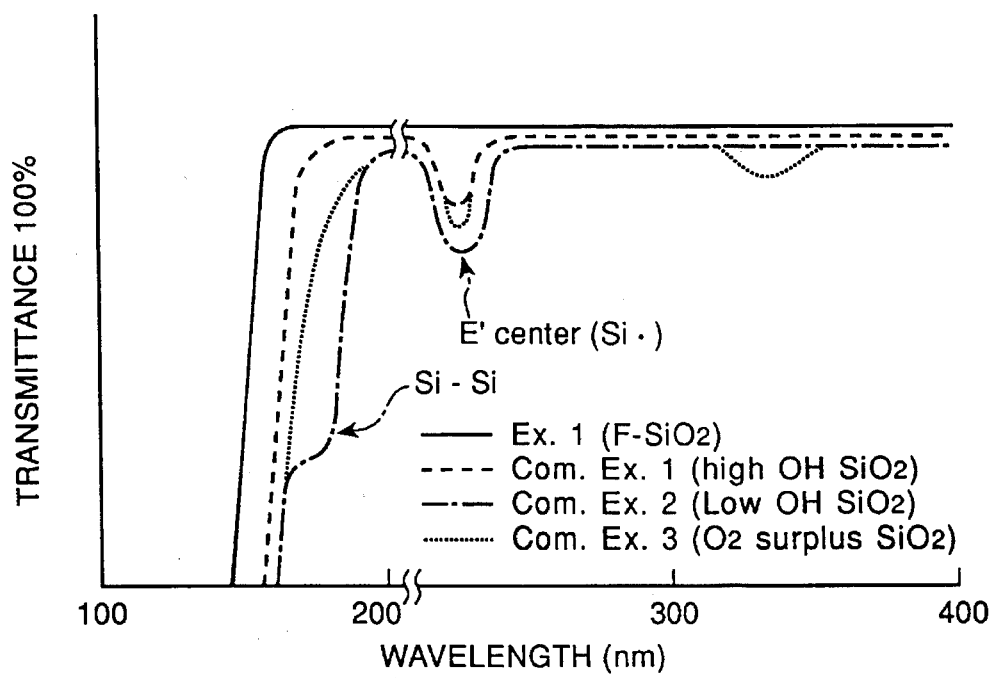

FIGS. 1 and 2 show the results of the comparison of transmissions between synthetic quartz glasses containing no fluorine and the fluorine-doped synthetic quartz glass of the present invention before and after irradiation with an excimer layer.

As seen from FIG. 1, among the synthetic quartz glasses, the fluorine-doped one and the OH-containing one do not have defect absorption, while the oxygen-surplus type one has the absorption due to the Si—O—O—Si group and the low OH one has the absorptions due to the Si—Si linkage and other Si linkage which is shown by

in FIG. 1. In addition, it is understood that the fluorine-doped UV light-permeable glass of the present invention broadens the UV light permeable range to a shorter wavelength side slightly and increases the transmission slightly.

FIG. 2 shows the changes of the transmissions after irradiation of the glasses with the excimer laser. That is, the results of FIG. 2 shows the long term reliability of the glasses. The fluorine-doped UV light-permeable glass suffers from no change, while other three glasses had significant defect absorption due to the E' center.

The reason for the above results may be considered as follows:

If the fluorine atoms are present in the quartz glass, a Si—F bond having a large bond energy of 592 kcal is formed according to the following reaction formula:

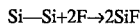

while the bond energy of Si—Si is 224 kcal. Therefore, the fluorine-doped glass is more stable than the fluorine-non-doped glass. Even if the E' center is formed, it reacts with the fluorine atom in the glass (Si.+F→SiF), whereby the formation of new absorption band can be prevented.

The fluorine content in the optical glass of the present invention may be quantitatively measured by a conventional method such as the Raman spectroscopy or the colorimetry. The fluorine content depends on the oxygen content in the glass which varies with the production method of the synthetic quartz glass, and should be an amount sufficient for stabilizing at least a part of the atomic groups which cause the defect absorptions. As a part of the atomic groups are stabilized, the transmission of the UV light increases and the fluorine-doped glass can be a useful optical glass in some applications. When an excessive amount of fluorine is doped, the absorption end of the UV light region shift to the long wavelength side and the permeable wavelength range is tends to be narrowed.

Figure 3:
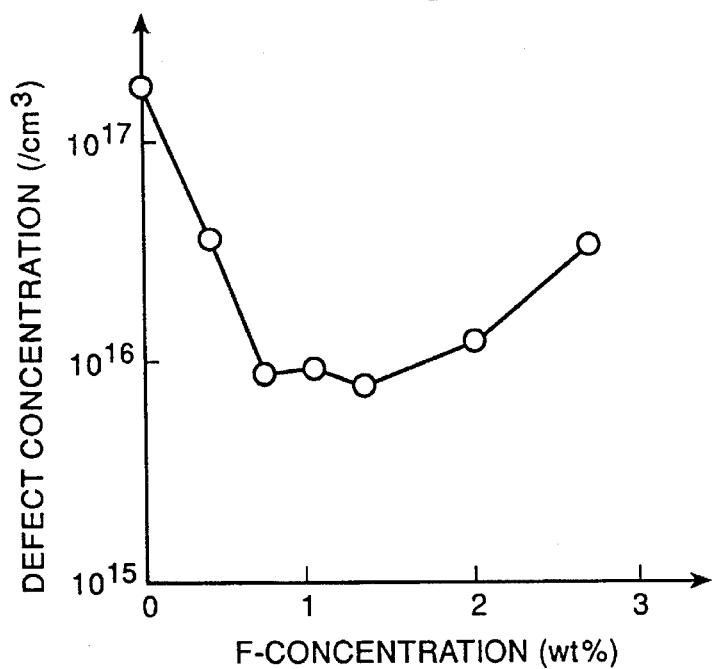
FIG. 3 shows a relationship between the fluorine concentration and the concentration of E' center defects in the glass.

FIG. 3 shows the relationship between the fluorine content in one glass of the present invention and the concentration of the E' center as the defect, which is measured by ESR. From FIG. 1, it is seen that a small amount of fluorine greatly decreases the concentration of the E' center defect and the concentration of the E' center defect is minimum around 1% by weight of the fluorine concentration. Further increase of the fluorine concentration slowly increases the E' center defect.

Figure 4:
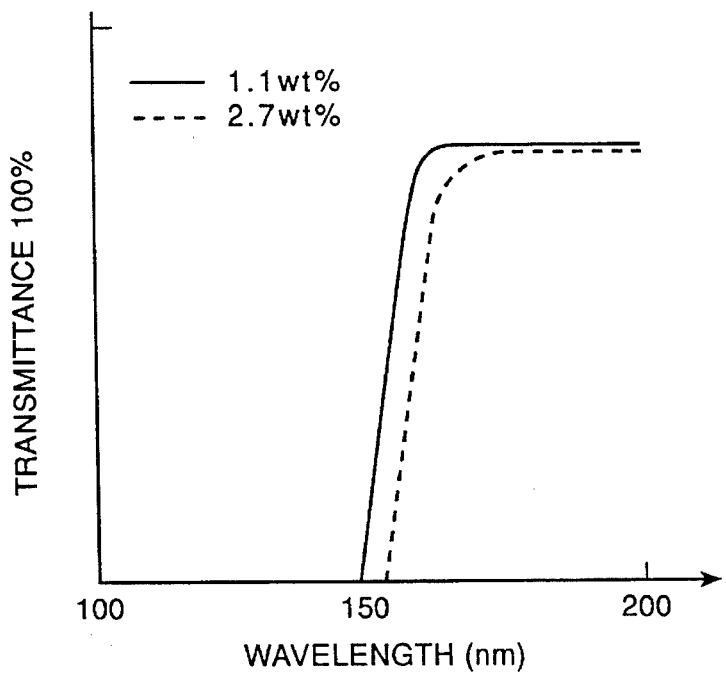
FIG. 4 shows a dependency of the UV light absorption end on the fluorine content in the glass.

FIG. 4 shows the influence of the fluorine content on the permeable UV region. As the fluorine concentration increases, the absorption end slightly shifts to the longer wavelength side.

The fluorine concentration which gives the best result in one glass can be easily determined by carrying preliminary experiments which give the results of FIG. 3. In general, the fluorine content in the glass for suppressing the defect absorption can be very small, and the large fluorine content may not be necessary. Preferably, the doped amount of the fluorine is from 0.5 to 3.0% by weight.

The transmission of the fluorine-doped synthetic quartz glass of the present invention is at least 80% in the UV and vacuum UV range of 155 to 400 nm and can be used in the production of various optical glass articles such as a photomask substrate (e.g. a photomask substrate for far ultraviolet light lithography), a lens for far ultraviolet or ultraviolet lasers, a prism, a cell of spectroscopy, a window material, a mirror and the like. The glass can be formed by any of methods which are used in forming the conventional quartz glass, such as cutting, abrasion, thermo-forming and the like.

The optical glass of the present invention may be any of the conventional fluorine-doped synthetic quartz glasses and may be produced by any method.

The fluorine may be doped to the glass according to the following reaction formula:

$$3SiO_2 + SiF_4 \rightarrow 4SiO_{1.5}F$$

Silicon tetrafluoride ($SiF_4$) as a dopant may be replaced with other reactive fluorine compound.

Examples of the synthesis method are a method comprising adding a dopant to the glass during the synthesis of the quartz glass by the vapor phase method wherein silicon tetrachloride and oxygen are reacted by heating them with a suitable heat source such as plasma, a resistance heater or an oxyhydrogen flame (see Japanese Patent Kokai Publication No. 15482/1980), a method comprising doping a porous soot mass of quartz fine particles which is produced by the vapor phase method (see Japanese Patent Kokai Publication No. 67533/1980), and a method comprising reacting a dopant with a porous quartz mass such as a porous dry gel of synthetic quartz which is produced by the so-called sol-gel method, in the presence of chlorine or a reactive chlorine compound (see Japanese Patent Kokai Publication No. 86045/1985). Among them, the last method is preferred for the production of the fluorine-doped synthetic quartz glass of the present invention, since a doping ratio of fluorine can be controlled up to a high fluorine concentration, and the corrosion of a reactor is suppressed whereby the contamination of the synthesized glass with impurities is decreased.

As the dopant, any fluorine-containing compound which is decomposed at high temperature and dopes the fluorine to the glass can be used. Examples of the dopant are $SiF_4$, $CF_4$, $F_2$, $SF_6$, $C_3F_8$ and $CCl_2F_2$.

Preferably, in the present invention, the above method is slightly modified to produce the fluorine-doped synthetic quartz glass. That is, the soot or the dry gel is first reacted with chlorine or the reactive chlorine compound and then reacted with the dopant. The chlorine reacts with the impurities contained in or entrained by the soot and removes them. The reactions may be carried out in an inert gas atmosphere such as helium and, if necessary, the reactions are stepwise carried out by changing a temperature, a time and a pressure. To this end, a localized heating furnace is convenient. Namely, the porous quartz mass such as the soot is passed through a heating zone of a quartz muffle tube in the localized heating furnace at a determined linear speed in a stream of the dopant diluted with the inert gas, and the glass and the dopant are reacted. Subsequently, they are reacted by changing the reaction conditions such as the temperature. Instead of the localized heating furnace, a uniform heating furnace may be used.

The doped amount of the fluorine depends on the partial pressure of the dopant in the reaction system. That is, when a decrease of the refractive index of the quartz glass by the fluorine doped is expressed in terms of a specific refractive index different (Δn %) and the concentration of the dopant in the reaction system (partial pressure) is "C", the following relationship exists:

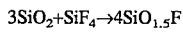

$$\Delta n = \alpha [C]^{1/4}$$

When the fluorine is doped to the glass by the $SiF_4$/He system, the constant α is 0.75, and Δn of −0.27% corresponds to the fluorine content of 1% by weight. Accordingly, Δn is a good criterion of the doped amount of the fluorine.

PREFERRED EMBODIMENTS OF THE INVENTION

The present invention will be illustrated by the following Examples.

EXAMPLE 1

By the flame hydrolysis method, a glass soot having a diameter of 150 mm and a length of 500 mm was produced from $SICl_4$, $O_2$ and $H_2$. Then, the glass soot was inserted in a muffle tube the localized heating furnace and passed through the heating zone at a linear speed of 4 mm/min. While keeping the heating zone at 1050° C., a chlorine gas ($Cl_2$) and helium were introduced in the heater at flow rates of 600 cc/min nd 15 1/min, respectively (a ratio of $Cl_2$ to He=0.04) [First step].

Then, the glass soot was treated in the same manner as in the first step except that the temperature of the heating zone was raised to 1250° C. and silicon tetrafluoride ($SiF_4$) was introduced at a flow rate of 400 cc/min. in place of the chlorine gas (a ratio of $SiF_4$ to He=0.027) [Second step].

Finally, the glass soot was further treated in the same manner as in the second step except that the temperature of the heating zone was raised to 1600° C.

Thereby, the sintered transparent glass mass containing 1.1% by weight of doped fluorine and having a diameter of 70 mm and a length of 260 mm was obtained.

The sintered glass mass was heated, softened and formed in a plate having a length of 50 mm and a thickness of 1 mm, and a transmission in the UV range (200 to 400 nm) and in the vacuum UV range (140 to 200 nm). The results are shown in FIG. 1.

Comparative Example 1

Using the same localized heating furnace as used in Example 1, the glass soot was passed through the heating zone at a linear speed of 4 mm/min. While keeping the heating zone at 1650° C., only helium was introduced in the heater at a flow rate of 15 l/min. to obtain a sintered glass mass containing OH groups at a high concentration. According to absorption at 3670 cm$^{-1}$ in the IR spectrum measurement, the concentration of the OH groups was calculated to be 300 ppm.

The UV light transmission through this sintered glass mass is shown in FIG. 1.

In comparison with the fluorine-doped glass of Example 1, the UV light absorption end shifted to the longer wavelength side and the transmission was slightly small.

Comparative Example 2

In the same manner as in Example 1 except that the heating temperature in the second step was raised to 1600° C. and the glass soot was vitrified in the helium atmosphere, a transparent glass mass was obtained. The OH content in the glass was less than 10 ppb.

The UV light transmission through this transparent glass mass is shown in FIG. 1. The defect absorptions due to Si—Si bonds were found at 165 nm and 250 nm.

The UV light absorption end shifted to the longer wavelength side.

Comparative Example 3

In the same manner as in Example 1 except that the heating temperatures in the second and third step were raised to 1200° C. and 1600° C., respectively, an oxygen gas was supplied at a flow rate of 1.5 l/min. in place of the SiF$_4$ gas in the second step and only the helium gas was supplied in the third step, a transparent glass mass was obtained.

The UV light transmission through this transparent glass mass is shown in FIG. 1. The defect absorption due to Si—O—O—Si bonds was found at 325 nm.

EXAMPLE 2

Each of the glass plates obtained in Example 1 and Comparative Examples 1, 2 and 3 was irradiated with the Ar—F laser (193 nm) at 200 mJ/cm$^2$.pulse×10$^5$.pulse and a frequency of 10 Hz.

The transmissions after irradiation are shown in FIG. 2.

EXAMPLE 3

In the same manner as in Example 1 except that the SiF$_4$/He ratio was changed, a fluorine-doped glass plate was produced.

Then, a concentration of the E' center defects which depends on the fluorine content was measured by ESR. Also, the transmission of the UV light was measured. The result of the former is shown in FIG. 3, and that of the latter is shown in FIG. 4.

The concentration of E' center defects was minimum at the fluorine content of about 1% by weight, and the UV light absorption end shifted to the longer wavelength side as the fluorine content increased.

EXAMPLE 4

By a conventional method, silicon ethoxide, water and aqueous ammonia were mixed to obtain a homogeneous sol solution, which was then gelled. The resulting gel was dried while raising the temperature from 40° C. to 180° C. over two weeks to obtain a porous dry gel. Then, the dry gel was heated to 500° C. in an oxygen atmosphere at a heating rate of 1° C./min. and kept standing at 500° C. for 2 hours to remove carbon components in the gel, whereby a gel mass having a bulk density of 0.4 g/cm$^3$ was obtained. The gel mass was processed to a diameter of 10 mm and a length of 40 mm and subjected to the following doping treatment.

The processed gel mass was inserted in the uniform heating furnace kept at 800° C., and heated for 5 hours while introducing the chlorine gas and helium at flow rates of 300 cc/min. and 10 l/min., respectively (a Cl$_2$/He ratio=0.03). Then, the heating temperature was raised to 1000° C. at a heating rate of 1° C./min. while introducing SiF$_4$ and helium at flow rates of 300 cc/min. and 10 l/min., respectively (a SiF$_4$/He ratio=0.03) and maintained at this temperature for 3 hours. Further, the temperature was raised to 1200° C. at a rate of 1° C./min. and maintained at this temperature for 3 hours. The obtained doped glass mass was a transparent sintered glass article having a diameter of 7 mm and a length of 20 mm.

This glass article contained 1.0% by weight of fluorine and had the same UV light transmission property as that of Example 1.

EXAMPLE 5

Using the plasma as the heating source, a fluorine-doped quartz glass was produced from SICl$_4$, O$_2$ and SiF$_4$. The obtained doped glass contained 1.5% by weight of fluorine and had the same UV light transmission property as that of Example 1.

EXAMPLE 6

The fluorine-doped glass plate is processed to a thickness of 2 mm and mirror polished. Then, from the polished glass plate, a cell for spectroscopy is assembled. The transmittance of the fluorine-doped quartz glass is at least 80% in the wavelength range from 160 nm to 400 nm.

EXAMPLE 7

A photomask substrate of 3 inches in diameter and 20 mm in thickness is produced from the fluorine-doped quartz glass and used in the far ultraviolet lithography. In comparison to the pure synthetic quartz glass, the life of photomask is expected to be prolonged.

EXAMPLE 8

The fluorine-doped quartz glass is processed in the form of an optical element such as a lens for a UV laser, a prism, a widow material and a mirror. The life of the optical element is prolonged by 20% in comparison with the conventional pure synthetic quartz glass.

EXAMPLE 9

In the same manner as in Example 1 but neglecting the first heating in the Cl$_2$/helium atmosphere, a sintered transparent glass mass was produced.

The transmission range was slightly widened to the short wavelength side in comparison with Example 1.

What is claimed is:

1. A method of making an optical glass permeable to UV light having a wave length of 155 nm to 400 nm comprising a fluorine-doped synthetic quartz glass having a composition of $SiO_{1.5}F$ in which a content of fluorine is about 1.5 to 3.0 percent by weight and which contains E' center defects in a decreased concentration, comprising the steps of:

reacting fluorine or a fluorine containing dopant with a porous quartz mass or a soot mass of quartz glass under conditions such that the resulting synthetic quartz glass has a composition of $SiO_{1.5}F$ and a content of fluorine of about 1.5 to 3.0 percent by weight.

2. The method according to claim 1, further comprising the steps of reacting said porous quartz mass or soot mass with chlorine or a chlorine containing dopant before reacting said porous quartz mass or soot mass with said fluorine or fluorine containing dopant.

3. The method according to claim 2, wherein said fluorine containing dopant is selected from the group consisting of $SiF_4$, $CF_4$, $F_2$, $SF_6$, $C_3F_8$, and $CCl_2F_2$.

4. The method according to claim 1, wherein an amount of said dopant is determined by the following formula:

$$n = \alpha(C)^{1/4}$$

wherein n is the amount of decrease of specific refractive index in %, C is the concentration of the dopant in the reaction system in partial pressure, and $\alpha$ is a constant.

* * * * *